United States Patent
Chen et al.

(10) Patent No.: US 8,807,692 B2
(45) Date of Patent: *Aug. 19, 2014

(54) INCORRECT STITCHING DETECTION IN A PRINTING SYSTEM

(75) Inventors: Samuel Chen, Penfield, NY (US); Mark C. Rzadca, Fairport, NY (US)

(73) Assignee: Eastman Kodak Company, Rochester, NY (US)

( * ) Notice: Subject to any disclaimer, the term of this patent is extended or adjusted under 35 U.S.C. 154(b) by 107 days.

This patent is subject to a terminal disclaimer.

(21) Appl. No.: 13/562,378

(22) Filed: Jul. 31, 2012

(65) Prior Publication Data

US 2014/0035991 A1 Feb. 6, 2014

(51) Int. Cl.
*B41J 29/393* (2006.01)
*B41J 29/38* (2006.01)
*B41J 2/21* (2006.01)
*G06K 9/36* (2006.01)

(52) U.S. Cl.
CPC ............. *B41J 29/393* (2013.01); *B41J 29/38* (2013.01); *B41J 2/2146* (2013.01); *G06K 9/36* (2013.01)
USPC ................................................. 347/19; 347/14

(58) Field of Classification Search
CPC ........ B41J 2/2146; B41J 29/393; B41J 29/38; G06K 9/36
USPC ................................................. 347/14, 15, 19
See application file for complete search history.

(56) References Cited

U.S. PATENT DOCUMENTS

| | | |
|---|---|---|
| 7,871,145 B1 | 1/2011 | Enge |
| 2011/0012949 A1 | 1/2011 | Enge |
| 2011/0012958 A1 | 1/2011 | Mantell et al. |
| 2011/0234673 A1 | 9/2011 | Ueshima |

*Primary Examiner* — An Do
(74) *Attorney, Agent, or Firm* — Nancy R. Simon; Amit Singhal (57) ABSTRACT

A method for monitoring stitching between two adjacent printheads includes capturing one or more images of content printed on a moving print media in at least a stitch boundary or overlap region to obtain pixel data. The pixel data is then averaged in a media transport direction to produce blur in an image or images. Derivative data of the averaged pixel data is determined and one or more peaks is detected in the derivative data. A type of stitching artifact is determined based on the detected peak in the derivative data.

14 Claims, 11 Drawing Sheets

INCORRECT STITCHING DETECTION IN A PRINTING SYSTEM

CROSS-REFERENCE TO RELATED APPLICATIONS

This patent application is related to U.S. patent application Ser. No. 13/562,369 entitled "MONITORING OF STITCHING BETWEEN PRINTHEADS" (now US Patent Publication No. 2014/0035990) and filed concurrently herewith. This patent application is related to U.S. patent application Ser. No. 13/537,240 and U.S. patent application Ser. No. 13/537,247, both filed on Jun. 29, 2012. This patent application is related to U.S. patent application Ser. No. 13/332,415 and U.S. patent application Ser. No. 13/332,417, both filed on Dec. 21, 2011.

TECHNICAL FIELD

The present invention generally relates to printing systems and more particularly to monitoring of stitching between printheads in a printing system.

BACKGROUND

In commercial inkjet printing systems, a print media is physically transported through the printing system at a high rate of speed. For example, the print media can travel 650-1000 feet per minute. A commercial inkjet printing system typically includes multiple lineheads that each jet ink or another type of liquid onto the moving print media. The width of a print media can range from 8.5 inches to 52 inches. To ensure ink can be deposited across the different widths of the print media, each linehead typically includes multiple printheads arranged to cover the varying widths of different types of print media.

Figure 1:
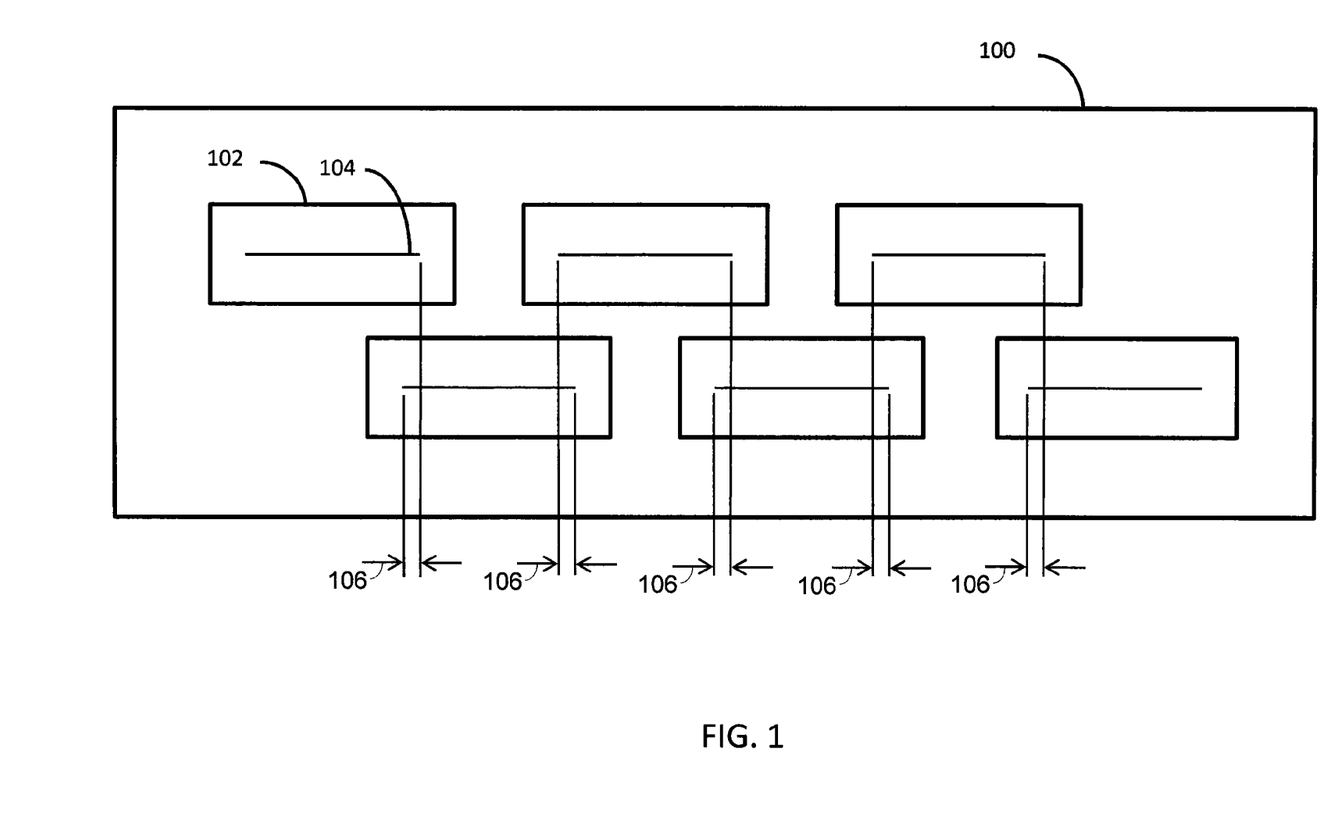
FIG. 1 illustrates a side of a linehead that is opposite a print media.

FIG. 1 illustrates a side of a linehead that is adjacent to a print media. The linehead 100 includes six printheads 102 in the illustrated embodiment. The printheads 102 are aligned in a staggered formation, with upstream and downstream printheads 102, such that the nozzle arrays 104 produce overlap regions 106. Each nozzle array 104 includes one or more lines of openings or nozzles that emit ink drops. The number of nozzles in a printhead can number in the thousands while the number of nozzles in an overlap region can number less than one hundred.

Figure 2:
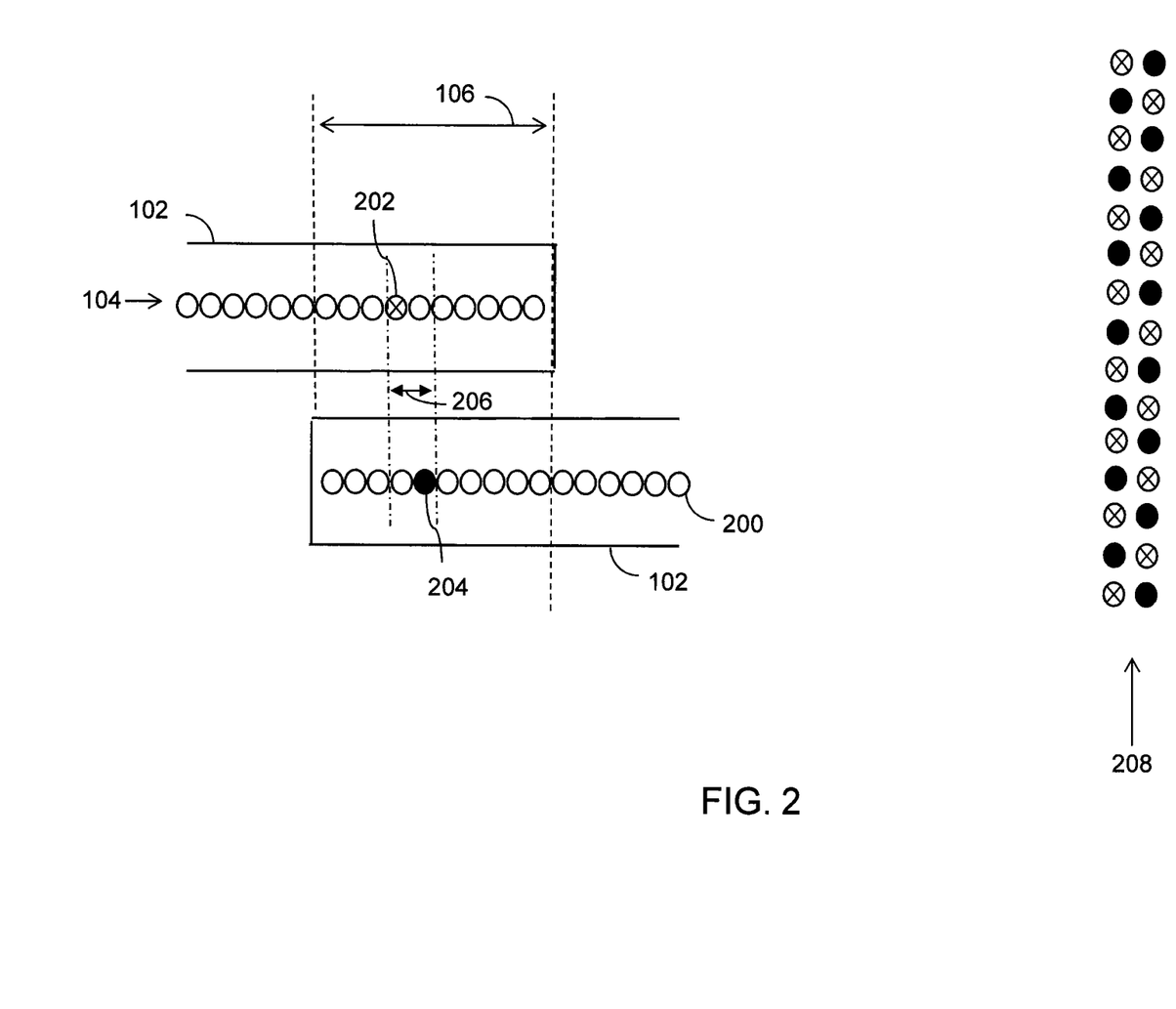
FIGS. 2 and 3 each depict a portion of two printheads 102 in an overlap region 106.
Figure 3:
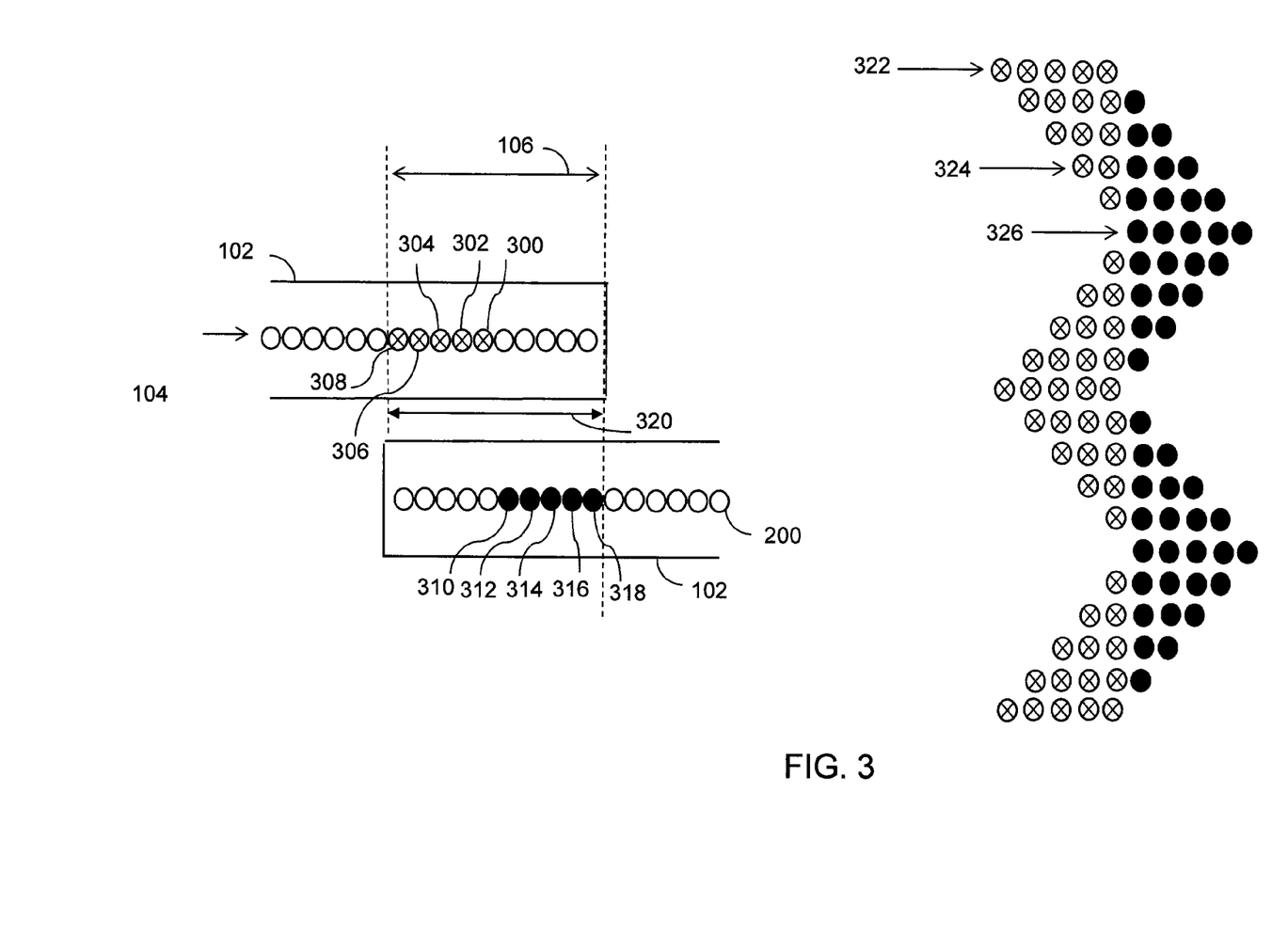

FIGS. 2 and 3 depict a portion of two printheads 102 in an overlap region 106. Each nozzle array 104 includes a single line of nozzles, and ten nozzles 200 are included within the overlap region 106 in the illustrated embodiment. The overlap regions 106 enable the print from overlapped printheads 200 to be stitched together without a visible seam through the use of appropriate stitching algorithms that are known in the art. For example, U.S. Pat. No. 7,871,145 and United States Patent Application Publication 2011/0012949 disclose methods for printing that reduce stitching errors or artifacts.

Typically, each nozzle can be independently controlled to jet ink or to not jet ink. A stitching algorithm is used to determine the best combination of nozzles to jet ink in the overlap regions to reduce or eliminate stitching artifacts. Stitching artifacts are produced when a stitch boundary in the overlap region is over-printed or under-printed. For example, a stitching algorithm can determine nozzle 202 (indicated by "X") and nozzle 204 (indicated by "●") alternately jet ink drops. The stitch boundary is the area 206. The ink dots 208 produced on the print media illustrate the alternating jetting of ink drops from the nozzles 202, 204. The actual placement of the ink dots 208 on the print media has been determined by an operator to reduce the occurrence of darker or lighter lines (e.g., stitch artifacts) in the printed content.

Alternatively, as shown in FIG. 3, a stitching algorithm can determine nozzles 300, 302, 304, 306, 308 jet inks in varying groups (indicated by "X"). The nozzles 310, 312, 314, 326, 318 jet ink in varying groups (indicated by "●"). The stitch boundary, indicated by 320, corresponds to the overlap region in the illustrated embodiment. The ink drops jetted from the nozzles produce a sawtooth or "s" pattern of ink dots on the print media. For example, when nozzles 300, 302, 304, 306, 308 jet ink drops, ink dots 322 are produced on the print media. When nozzles 300, 302, 310, 312, 314 jet ink drops, ink dots 324 are produced on the print media. And when nozzles 310, 312, 314, 316, 318 jet ink drops, ink dots 326 are produced on the print media. Stitching algorithms ensure the amount of ink printed in the stitch boundary 320 in the overlap region 106 is not higher or lower than other areas of the printed content.

Figure 4:
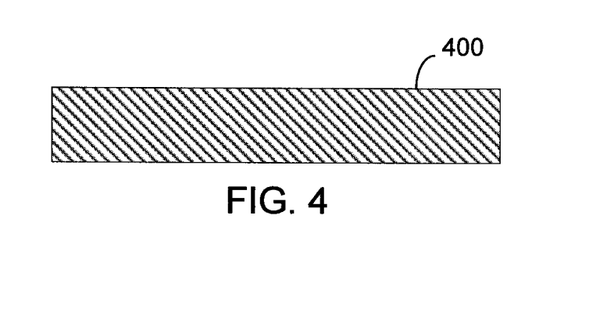
FIGS. 4-6 illustrate stitched printed content in an overlap region.
Figure 5:
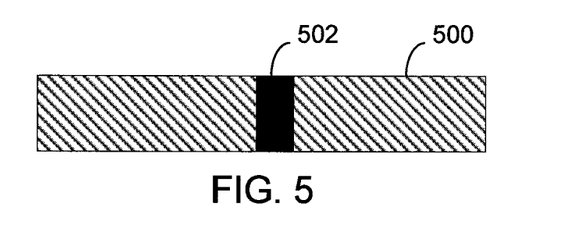
Figure 6:
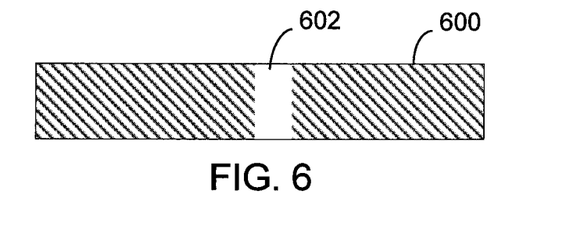

FIGS. 4-6 illustrate stitched printed content in an overlap region. FIG. 4 depicts printed content 400 that does not include any stitching artifacts. The proper combination of nozzles to jet ink in the overlap region has been determined such that the ink coverage in the overlap region has limited overlap and a minimal amount of unprinted areas.

FIG. 5 illustrates printed content 500 that includes a stitching artifact 502 produced by over-printing in or around the stitch boundary in the overlap region. Too many nozzles jetted ink and produced the dark band artifact 502. FIG. 6 depicts printed content 600 that includes a stitching artifact 602 produced by under-printing in the overlap region. Too few nozzles jetted ink and produced the light band artifact 602. The artifacts 502 and 602 can become visible when the size of the dark or light band is sufficiently large.

Stitching artifacts continue in the direction the print media is traveling until the stitching algorithm is adjusted. Unfortunately, the necessary corrections may not occur for hundreds or thousands of feet of print media, which results in waste when the printed content is not usable. Additionally, wasted print media causes the print job to be more costly and time consuming.

Stitching artifacts can range in size from microns to millimeters. Current stitching artifact detection systems use high resolution and high magnification cameras designed to detect discrete artifacts in the printed content. The high resolution and high magnification cameras are purposefully designed to avoid blur in the captured image so that an operator can see each ink dot deposited on the surface of the print media in an overlap region and determine the effectiveness of a stitching algorithm. Due to the expense of these high resolution and high magnification camera, only a few are typically used in a commercial printing system. In some printing systems, only two cameras are provided; one camera for each side of the print media. In such printing systems, a camera may have to be moved from one overlap region to another overlap region to determine the most effective stitching algorithm to use. This serial method of stitch correction takes time to accomplish and requires many pages to be printed during the correction process. More importantly, the high resolution and high magnification cameras are not configured to continuously monitor multiple overlap regions during a print job.

SUMMARY

In one aspect, a printing system includes a linehead that includes two adjacent printheads, a stitch boundary formed by the two adjacent printheads, and an integrated imaging system positioned opposite a moving print media for capturing one or more images of content printed on the moving print media in at least the stitch boundary. The integrated imaging system includes a housing; an opening in the housing for receiving light reflected from the moving print media; a folded optical assembly in the housing that receives the reflected light and transmits the light a predetermined distance; and an image sensor within the housing that receives the light and captures the one or more images. An image processing device is connected to the integrated imaging system and adapted to determine derivative data of averaged pixel data obtained from the one or more captured images and to detect one or more peaks in the derivative data that represent stitching artifacts.

In another aspect, a method for monitoring the stitching between the two adjacent printheads includes (a) capturing one or more images of content printed on a moving print media in at least a stitch boundary to obtain pixel data; (b) averaging the pixel data to produce blur in a media transport direction; (c) determining derivative data of the averaged pixel data; (d) detecting a peak in the derivative data; and (e) determining a type of stitching artifact based on the detected peak in the derivative data.

In another aspect, a printing system includes a linehead that includes two adjacent printheads positioned in a staggered formation. Each printhead includes multiple nozzles, where a portion of nozzles in one printhead overlaps a portion of nozzles in the other printhead to form an overlap region. An integrated imaging system is positioned opposite a moving print media for capturing one or more images of content printed on the moving print media in at least the overlap region. The integrated imaging system includes a housing; an opening in the housing for receiving light reflected from the moving print media; a folded optical assembly in the housing that receives the reflected light and transmits the light a predetermined distance; and an image sensor within the housing that receives the light and captures the one or more images. An image processing device is connected to the integrated imaging system and adapted to determine derivative data of averaged pixel data obtained from the one or more captured images and to detect one or more peaks in the derivative data that represent stitching artifacts.

In another aspect, a method for monitoring the stitching between the two adjacent printheads includes (a) capturing one or more images of content printed on a moving print media in at least the overlap region to obtain pixel data; (b) averaging the pixel data to produce blur in a media transport direction; (c) determining derivative data of the averaged pixel data; (d) detecting a peak in the derivative data; and (e) determining a type of stitching artifact based on the detected peak in the derivative data.

BRIEF DESCRIPTION OF THE DRAWINGS

Embodiments of the invention are better understood with reference to the following drawings. The elements of the drawings are not necessarily to scale relative to each other.

DETAILED DESCRIPTION

Throughout the specification and claims, the following terms take the meanings explicitly associated herein, unless the context clearly dictates otherwise. The meaning of "a," "an," and "the" includes plural reference, the meaning of "in" includes "in" and "on." Additionally, directional terms such as "on", "over", "top", "bottom", "left", "right" are used with reference to the orientation of the Figure(s) being described. Because components of embodiments of the present invention can be positioned in a number of different orientations, the directional terminology is used for purposes of illustration only and is in no way limiting.

The present description will be directed in particular to elements forming part of, or cooperating more directly with, an apparatus in accordance with the present invention. It is to be understood that elements not specifically shown, labeled, or described can take various forms well known to those skilled in the art. In the following description and drawings, identical reference numerals have been used, where possible, to designate identical elements. It is to be understood that elements and components can be referred to in singular or plural form, as appropriate, without limiting the scope of the invention.

The example embodiments of the present invention are illustrated schematically and not to scale for the sake of clarity. One of ordinary skill in the art will be able to readily determine the specific size and interconnections of the elements of the example embodiments of the present invention.

As described herein, the example embodiments of the present invention provide a printhead or printhead components typically used in inkjet printing systems. However, many other applications are emerging which use inkjet printheads to emit liquids (other than inks) that need to be finely metered and deposited with high spatial precision. Such liquids include inks, both water based and solvent based, that include one or more dyes or pigments. These liquids also include various substrate coatings and treatments, various medicinal materials, and functional materials useful for forming, for example, various circuitry components or structural components. As such, as described herein, the terms "liquid" and "ink" refer to any material that is ejected by the printhead or printhead components described below.

Inkjet printing is commonly used for printing on paper. However, there are numerous other materials in which inkjet is appropriate. For example, vinyl sheets, plastic sheets, textiles, paperboard, and corrugated cardboard can comprise the print media. Additionally, although the term inkjet is often used to describe the printing process, the term jetting is also appropriate wherever ink or other liquids is applied in a consistent, metered fashion, particularly if the desired result is a thin layer or coating.

Inkjet printing is a non-contact application of an ink to a print media. Typically, one of two types of ink jetting mechanisms are used and are categorized by technology as either drop on demand ink jet (DOD) or continuous ink jet (CIJ). The first technology, "drop-on-demand" (DOD) ink jet printing, provides ink drops that impact upon a recording surface using a pressurization actuator, for example, a thermal, piezoelectric, or electrostatic actuator. One commonly practiced drop-on-demand technology uses thermal actuation to eject ink drops from a nozzle. A heater, located at or near the nozzle, heats the ink sufficiently to boil, forming a vapor bubble that creates enough internal pressure to eject an ink drop. This form of inkjet is commonly termed "thermal ink jet (TIJ)."

The second technology commonly referred to as "continuous" ink jet (CIJ) printing, uses a pressurized ink source to produce a continuous liquid jet stream of ink by forcing ink, under pressure, through a nozzle. The stream of ink is perturbed using a drop forming mechanism such that the liquid jet breaks up into drops of ink in a predictable manner. One continuous printing technology uses thermal stimulation of the liquid jet with a heater to form drops that eventually become print drops and non-print drops. Printing occurs by selectively deflecting one of the print drops and the non-print drops and catching the non-print drops. Various approaches for selectively deflecting drops have been developed including electrostatic deflection, air deflection, and thermal deflection.

Additionally, there are typically two types of print media used with inkjet printing systems. The first type is commonly referred to as a continuous web while the second type is commonly referred to as a cut sheet(s). The continuous web of print media refers to a continuous strip of media, generally originating from a source roll. The continuous web of print media is moved relative to the inkjet printing system components via a web transport system, which typically include drive rollers, web guide rollers, and web tension sensors. Cut sheets refer to individual sheets of print media that are moved relative to the inkjet printing system components via rollers and drive wheels or via a conveyor belt system that is routed through the inkjet printing system.

The invention described herein is applicable to both types of printing technologies. As such, the terms linehead and printhead, as used herein, are intended to be generic and not specific to either technology. Additionally, the invention described herein is applicable to both types of print media. As such, the terms web and print media, as used herein, are intended to be generic and not specific to either type of print media or the way in which the print media is moved through the printing system.

Figure 7:
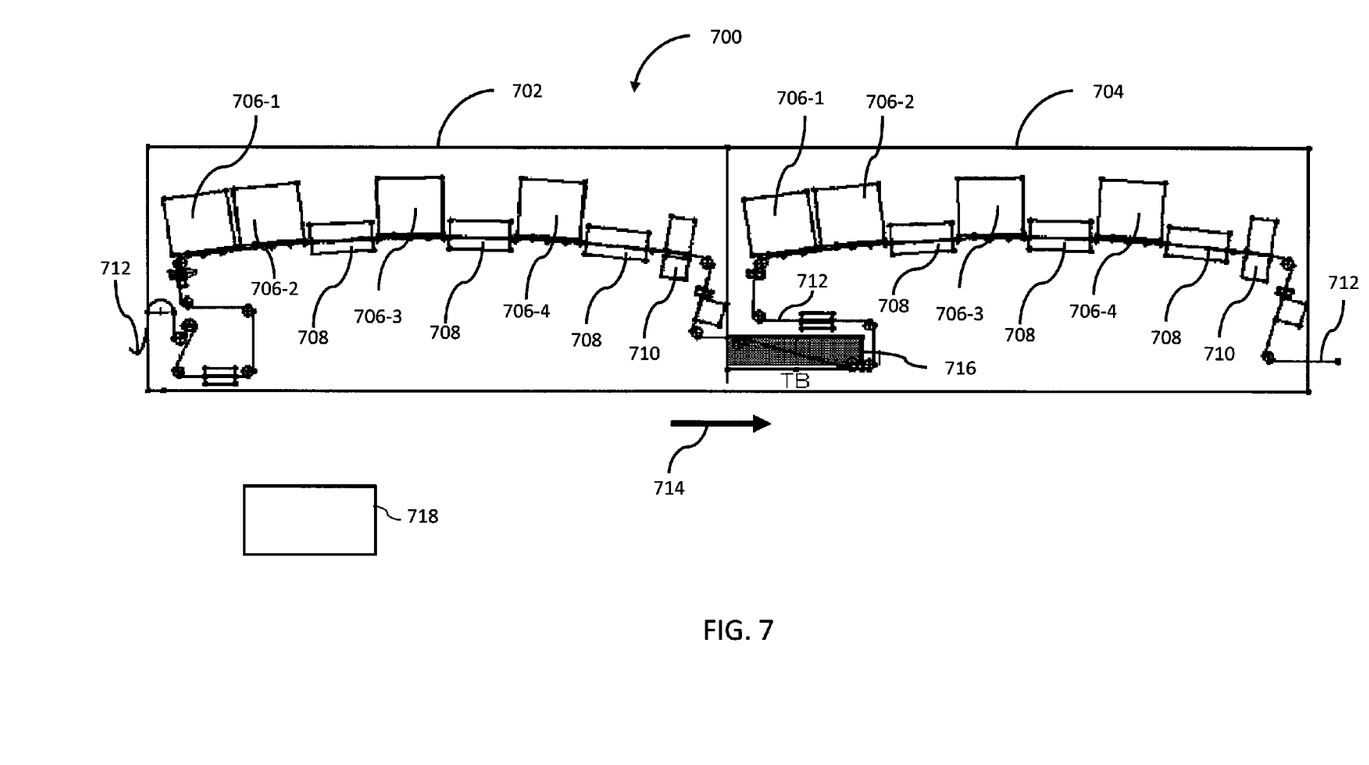
FIG. 7 depicts one example of an inkjet printing system for continuous web printing on a print media.
Figure 8:
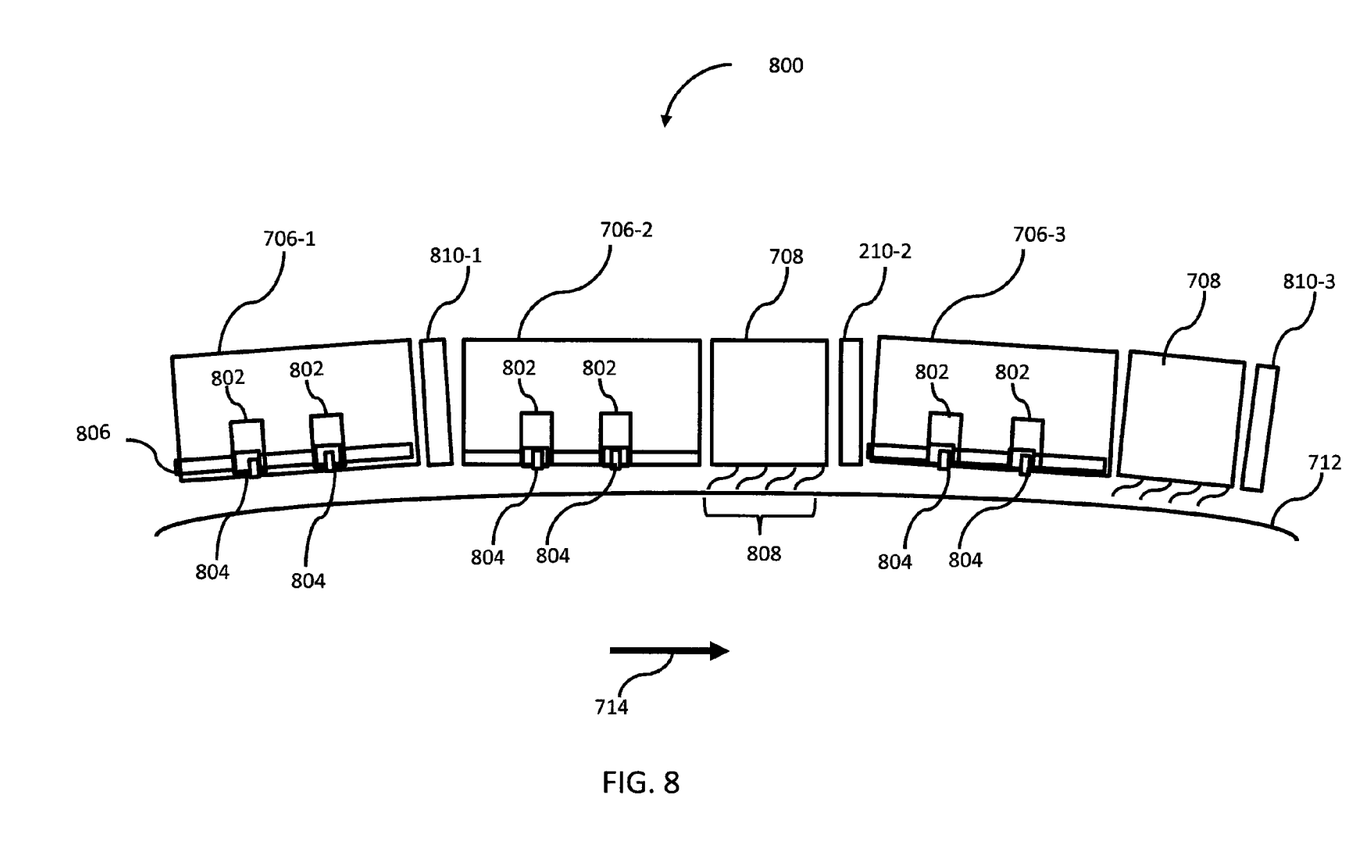
FIG. 8 depicts a portion of one example of a printing system in an embodiment in accordance with the invention.

The terms "upstream" and "downstream" are terms of art referring to relative positions along the transport path of the print media; points on the transport path move from upstream to downstream. In FIGS. 7 and 8 the media moves in the direction indicated by media transport direction arrow 714. Where they are used, terms such as "first", "second", and so on, do not necessarily denote any ordinal or priority relation, but are simply used to more clearly distinguish one element from another.

Referring now to the schematic side view of FIG. 7, there is shown one example of an inkjet printing system for continuous web printing on a print media. Printing system 700 includes a first printing module 702 and a second printing module 704, each of which includes lineheads 706, dryers 708, and a quality control sensor 710 positioned opposite a continuous web of print media 712. Each linehead 706 typically includes multiple printheads (not shown) that apply ink or another liquid to the surface of the print media 712. For descriptive purposes only, the lineheads 706 are labeled a first linehead 706-1, a second linehead 706-2, a third linehead 706-3, and a fourth linehead 706-4. In the illustrated embodiment, each linehead 706-1, 706-2, 706-3, 706-4 applies a different colored ink to the print media 712. By way of example only, linehead 706-1 applies cyan colored ink, linehead 706-2 magenta colored ink, linehead 706-3 yellow colored ink, and linehead 706-4 black colored ink.

The first printing module 702 and the second printing module 704 also include a web tension system that serves to physically move the print media 712 through the printing system 700 in a media transport or feed direction 714 (left to right as shown in the figure). The print media 712 enters the first printing module 702 from a source roll (not shown) and the linehead(s) 106 of the first module applies ink to one side of the print media 712. As the print media 712 feeds into the second printing module 704, a turnover module 716 is adapted to invert or turn over the print media 712 so that the linehead(s) 706 of the second printing module 704 can apply ink to the other side of the print media 712. The print media 712 then exits the second printing module 704 and is collected by a print media receiving unit (not shown).

Processing device 718 can be connected to various components in the web tension system and used to control the positions of the components, such as gimbaled or caster rollers. Processing device 718 can be connected to the quality control sensor 710 and used to process images or data received from the sensor 710. Processing device can be connected to components in printing system 700 using any known wired or wireless communication connection. Processing device 718 can be separate from printing system 700 or integrated within printing system 700 or within a component in printing system 700.

Although FIG. 7 depicts each printing module with four lineheads 706, three dryers 708, and one quality control sensor 710, embodiments in accordance with the invention are not limited to this construction. A printing system can include any number of lineheads, any number of dryers, and any number of quality control sensors. The printing system can also include a number of other components, including, but not limited to, web cleaners and web tension sensors.

And although the printing system shown in FIG. 7 has the turnover module 716 disposed between the first and second printing modules 702, 704, other printing systems can include the turnover module within one of the printing modules.

FIG. 8 illustrates a portion of one example of a printing system in an embodiment in accordance with the invention. As the print media 712 is directed through printing system 800, the lineheads 706, which typically include a plurality of printheads 802, apply ink or another liquid onto the print media 712 via the nozzle arrays 804 of the printheads 802. The printheads 802 within each linehead 706 are located and aligned by a support structure 806 in the illustrated embodiment. After the ink is jetted onto the print media 712, the print media 712 passes beneath the dryers 708 which apply heat or air 808 to the ink on the print media.

Integrated imaging system 810 is positioned opposite the print media 712 and captures images of the print media 712. An integrated imaging system 810 is positioned downstream of at least one linehead. In the illustrated embodiment, an integrated imaging system 810-1, 810-2, 810-3 is positioned downstream of a respective linehead 706-1, 706-2, 706-3. In another embodiment, an integrated imaging system 810 is located after the last linehead 706-3 in a printing system or printing module. The integrated imaging system 810 is described in more detail in conjunction with FIGS. 9-11.

Figure 9:
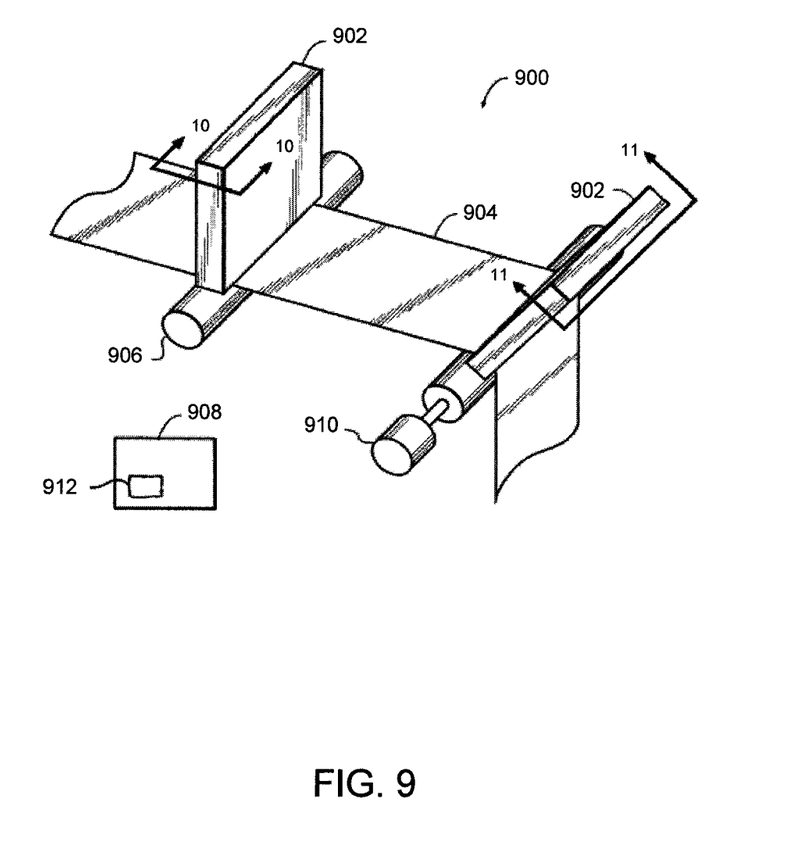
FIG. 9 illustrates a portion of one example of a printing system in an embodiment in accordance with the invention.

Referring now to FIG. 9, there is shown a portion of a printing system in an embodiment in accordance with the invention. Printing system 900 includes one or more integrated imaging systems 902 disposed over the print media 904. The integrated imaging systems 902 are connected to an image processing device 908 that can be used to process images captured by one or both integrated imaging systems 902 and monitor the stitching between the printheads. Embodiments in accordance with the invention can monitor stitching continuously or at select times.

Communications and data transmission between the integrated imaging system 902 and the image processing device 908 can be performed using any known wired or wireless connection. Image processing device 908 can be external to printing system 900; integrated within printing system 900; or integrated within a component in printing system 900. The image processing device 908 can be one or more processing devices, such as a computer or a programmable logic circuit.

The integrated imaging systems 902 are disposed over the print media 904 at locations in a printing system where the print media is transported over rollers 906 in an embodiment in accordance with the invention. The print media can be more stable, both in the cross-track and in-track (feed) directions, when moving over the rollers 906. In other embodiments in accordance with the invention, one or more integrated imaging systems can be positioned at locations where the print media is not transported over rollers or other support devices.

Motion encoder 910 can be used to produce an electronic pulse or signal proportional to a fixed amount of incremental motion of the print media in the feed direction. The signal from motion encoder 910 is used to trigger an image sensor (see 1006 in FIG. 10) to begin capturing an image of the printed content on the moving print media using the light reflected off the print media.

Connected to the image processing device 908 is one or more storage devices 912. The storage device 912 can be used to store data used by the lineheads when printing content on the print media or used to control settings or operations of various components within the printing system. The storage device 912 can be implemented as one or more external storage devices; one or more storage devices included within the image processing device 908; or a combination thereof.

Although image processing device 908 and processing device 718 are depicted as separate devices, those skilled in the art will recognize that image processing device 908 and processing device 718 can be implemented with the same processing device or devices.

Figure 10:
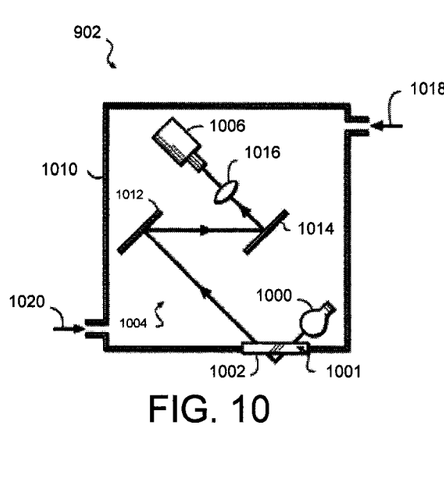
FIG. 10 is a cross-sectional view along line 10-10 in FIG. 9 in an embodiment in accordance with the invention.

FIG. 10 is a cross-sectional view along line 10-10 in FIG. 9 in an embodiment in accordance with the invention. Integrated imaging system 902 includes light source 1000, transparent cover 1002, folded optical assembly 1004, and image sensor 1006 all enclosed within housing 1010. In the illustrated embodiment, folded optical assembly 1004 includes mirrors 1012, 1014 and lens 1016. Mirrors 1012, 1014 can be implemented with any type of optical elements that reflects light in embodiments in accordance with the invention. Lens 1016 can be constructed with one or more fixed focal length lenses; one or more zoom lenses; or a combination of one or more fixed focal length lenses and one or more zoom lenses.

Light source 1000 transmits light through transparent cover 1002 and towards the surface of the print media (not shown). The light reflects off the surface of the print media and propagates through the transparent cover 1002 and along the folded optical assembly 1004, where mirror 1012 directs the light towards mirror 1014, and mirror 1014 directs the light toward lens 1016. The light is focused by lens 1016 to form an image on image sensor 1006. Image sensor 1006 captures one or more images of the print media as the print media moves through the printing system by converting the reflected light into electrical signals.

Folded optical assembly 1004 bends or directs the light as it is transmitted to image sensor 1006 such that the optical path traveled by the light is longer than the size of integrated imaging system 902. Folded optical assembly 1004 allows the integrated imaging system 902 to be constructed more compactly, reducing the weight, dimensions, and cost of the integrated imaging system. Folded optical assembly 1004 can be constructed differently in other embodiments in accordance with the invention. Additional or different optical elements can be included in folded optical assembly 1004.

As discussed earlier, image sensor 1006 can receive a signal from a motion encoder (e.g., 910 in FIG. 9) each time an incremental motion of the print media occurs in the feed direction. The signal from the motion encoder is used to trigger image sensor 1006 to begin integrating the light reflected from the print media. In the case of a linear image sensor, the unit of incremental motion is typically configured such that an integration period begins with sufficient frequency to sample or image the print media in the feed direction with the same resolution as is produced in the cross-track direction. If the trigger occurs at a rate which produces a rate that results in sampling in the in-track (feed) direction at a higher rate, an image that is over sampled in that direction is produced and the imaged content appears elongated or stretched in the in-track direction. Conversely, a rate that is lower for the in-track direction produces imaged content that is compressed in the in-track direction.

The time period over which the integration occurs determines how much print media moves through the field of view of the imaging system. With shorter integration periods such as a millisecond or less, the motion of the print media can be minimized so that fine details in the in-track direction can be imaged. When longer integration periods are used, the light reflected off the print media is collected while the print media is moving and the motion of the print media means the printed content is blurred in the direction of motion. The blurring in the direction of motion has the effect of averaging the pixel data in one direction, the in-track (feed) direction. Averaging the pixel data through blurring is also known as optical averaging. By performing the averaging optically with longer integration periods, the amount of data that is transferred to and processed by an image processing device (e.g., 908 in FIG. 9) is reduced. Blurring reduces image resolution in the in-track direction, and is therefore generally avoided for applications that require the identification of artifacts that are small and occur randomly.

The transparent cover 1002 is disposed over an opening 1001 in the housing 1010. Transparent cover 1002 is optional and can be omitted in other embodiments in accordance with the invention.

Integrated imaging system 902 can also include vent openings 1018, 1020. Vent opening 1018 can be used to input air or gas while vent opening 1020 can be used to output exhaust. The input air or gas can be used to maintain a clean environment and control the temperature within integrated imaging system 902. In another embodiment in accordance with the invention, integrated imaging system 902 can include one or more vent openings (e.g., vent opening 1018) that input air or gas and the opening 1001 in the housing 1010 is used to output exhaust.

Figure 11:
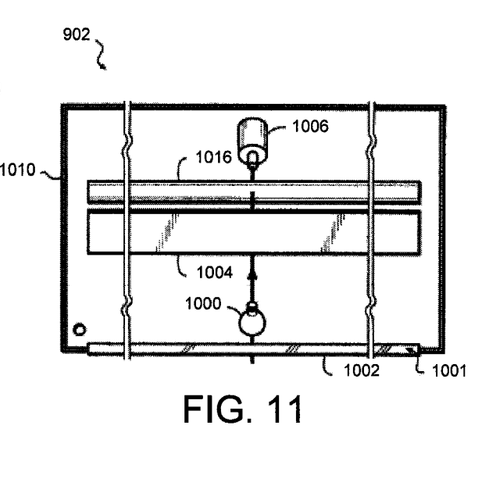
FIG. 11 is a cross-sectional view along line 11-11 in FIG. 9 in an embodiment in accordance with the invention.

FIG. 11 is a cross-sectional view along line 11-11 in FIG. 9 in an embodiment in accordance with the invention. As described, light source 1000 transmits light through transparent cover 1002 and towards the surface of the print media (not shown). The light reflects off the surface of the print media, propagates along folded optical assembly, and is directed toward lens 1016. Lens 1016 focuses the light to form an image on image sensor 1006. Image sensor 1006 can be implemented with any type of image sensor, including, but not limited to, one or more linear image sensors constructed as a charge-coupled device (CCD) image sensor or a complementary metal oxide semiconductor (CMOS) image sensor.

Figure 12:
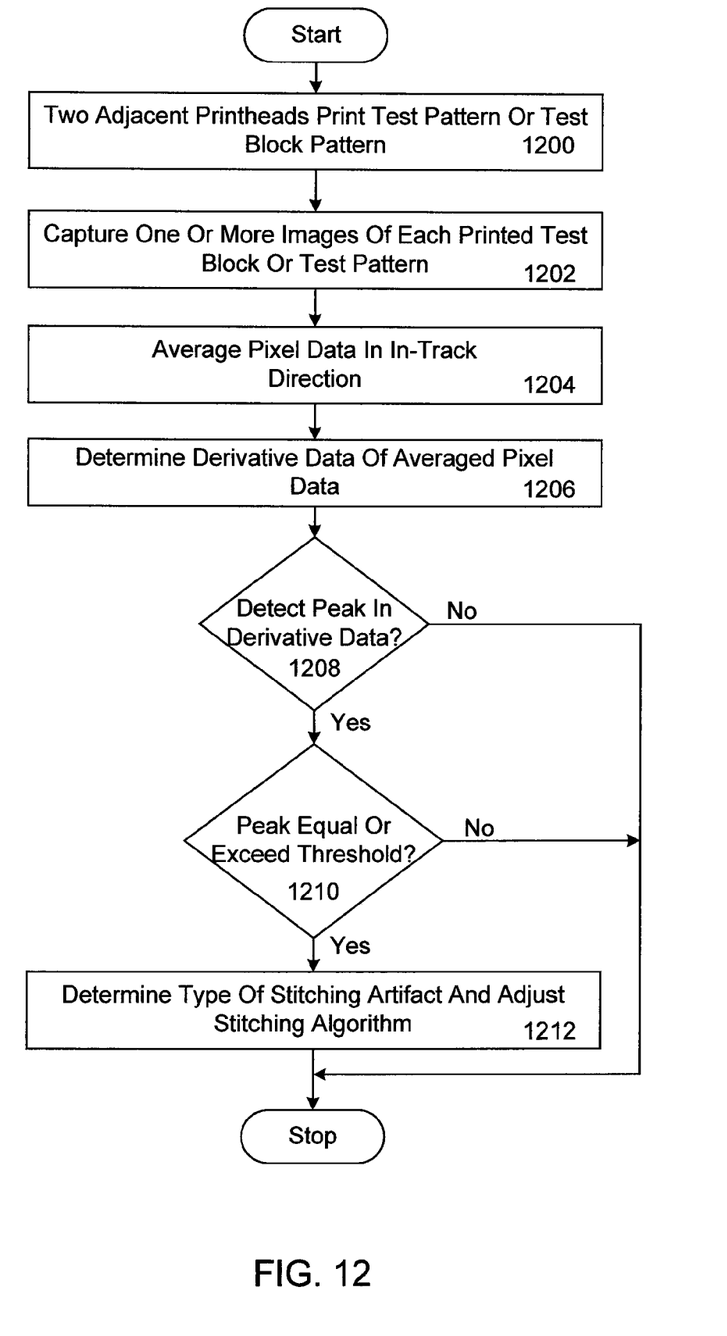
FIG. 12 is a flowchart of a method for monitoring stitching between printheads in an embodiment in accordance with the invention.

The images of the print media formed on the image sensor 1006 are converted to digital representations that are suitable for analysis in a computer or processing device. By way of example only, the image processing device 908 can be used to process the images and monitor the stitching between printheads. Referring now to FIG. 12, there is shown a flowchart of a method for the monitoring of stitching between printheads in an embodiment in accordance with the invention. In one embodiment, two adjacent printheads form a stitch boundary by being arranged to form an overlap region with the stitch boundary included in the overlap region. In another embodiment, the two adjacent printheads can form a stitch boundary by being positioned end-to-end in the cross-track direction, either in a staggered arrangement or an in-line arrangement.

The method is described in conjunction with one stitch boundary. As discussed earlier, the stitch boundary can be included in an overlap region. Those skilled in the art will recognize the method can be performed either simultaneously or at select times for multiple stitch boundaries in one or more lineheads. For example, the method can be performed for all of the stitch boundaries in all of the lineheads. Additionally, the method can be performed prior to a print job to determine the most effective stitching algorithm or during a print job to monitor the stitching.

Initially, a test pattern or a test block pattern is printed on the print media by two adjacent printheads in a linehead (block 1200). The printed test pattern or test block pattern is printed by all of the nozzles in each printhead, thereby including the area in or around the stitch boundary. In another embodiment, only the nozzles in an overlap region or a stitch boundary print the test pattern or test block pattern. The test pattern can be printed with a known print density. A test block pattern includes two or more test blocks with at least one test block having a different print density than the other test blocks in the test block pattern.

The test pattern or test block pattern can be printed as a visible or a non-objectionable test pattern or test block pattern. A non-objectionable test pattern forms a pattern, shape, or design that is not significantly discernable by the human vision system or intelligence but can be detected by an integrated imaging system (e.g., see 902 in FIGS. 9-11). The marks included in each test pattern can be regularly or irregularly spaced so long as they appear non-objectionable.

A test pattern or test block pattern can be disposed within both the content area and at least one margin adjacent to the content area, only within the content area, or only within at least one margin. The content area is an area on the print media where published information such as text, images, animation, and graphics will be printed on the print media. The content area is surrounded by the margin of print media where published information is not printed. A test pattern or test block pattern disposed within the content area is implemented as non-objectionable test pattern. A test pattern or test block pattern formed in one or more margins can be configured as a non-objectionable or as a visible test pattern or test block pattern.

Next, as shown in blocks 1202 and 1204, one or more images of the printed test pattern or test block pattern is captured by an integrated imaging system and the pixel data averaged in the media transport direction to produce blurring in an image or images. The pixel data is averaged optically through the use of a longer integration time in one embodiment in accordance with the invention. The amount of optical averaging can be increased by reducing the frequency of the pulses from the motion encoder (e.g., 910 in FIG. 9) and extending the integration time of the image sensor (e.g., 1006 in FIG. 10) in the integrated imaging system (e.g., 902 in FIG. 9). Reducing the frequency of the pulses can have the benefit of reducing the amount of data transferred to the image processing device and of reducing the numerical averaging performed by the image processing device (e.g., 908 in FIG. 9). Additional numerical averaging or other image processing of the pixel data in the in-track direction can be computed by the processing device on images captured by the image sensor. The amount of optical image averaging can be decreased with an increase in the numerical averaging required. The ability to using optical averaging can not only significantly reduce the camera hardware cost, but also its footprint size, and all without sacrificing the ability to detect inkjet printing related artifacts.

In another embodiment in accordance with the invention, averaging of the pixel data in the media transport direction can be performed by an image processing device (e.g., 908 in FIG. 9) using multiple images captured by the integrated imaging system. The images can be captured with shorter integration times in an embodiment in accordance with the invention. The processing device numerically averages the pixel data in one direction, the in-track direction, to produce blurring in an image or images. The processing device can also perform other types imaging processing procedures in addition to the numerical averaging of the pixel data.

Next, as shown in block 1206, derivative data of the averaged pixel data is determined. In one embodiment, first derivative data is determined for the averaged pixel data. In another embodiment, second derivative data is determined.

A determination is then made at block 1208 as to whether or not one or more peaks is detected in the derivative data. A peak can represent a stitching artifact on the print media. In one embodiment, data regarding the expected locations of the stitch boundaries on the print media is combined with the known width of the print media to assist in determining whether a peak represents a stitching artifact.

When one or more peaks is detected, a determination is made at block 1210 as to whether or not each peak equals or exceeds a threshold value. If a peak equals or exceeds a threshold value, the process continues at block 1212 where the type or types of stitching artifacts is determined and the stitching algorithm adjusted. The stitching algorithm can employ a different combination of nozzles in the stitch boundary (or in an overlap region) when the currently used combination begins to produce stitching artifacts on the print media. Determining the type of stitching artifact is discussed in more detail in conjunction with FIGS. 17 and 18.

Embodiments in accordance with the invention can perform the method depicted in FIG. 12 differently or can include additional functions or processes. For example, second derivative data can be determined from first derivative data at block 1206. The second derivative data produces a peak that includes only a single region (i.e., a single negative region or a single positive region). The one or more peaks are then detected in the second derivative data. Additionally, some of the blocks can be omitted in other embodiments in accordance with the invention. By way of example only, block 1210 can be omitted.

Figure 13:
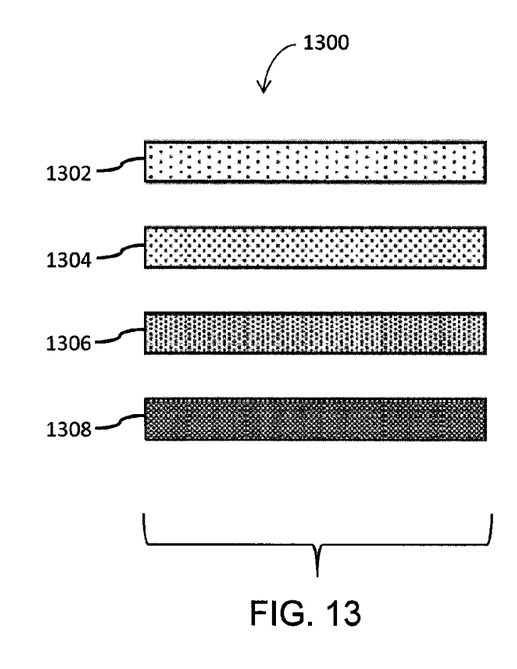
FIGS. 13-15 depict examples of test block patterns in an embodiment in accordance with the invention.
Figure 14:
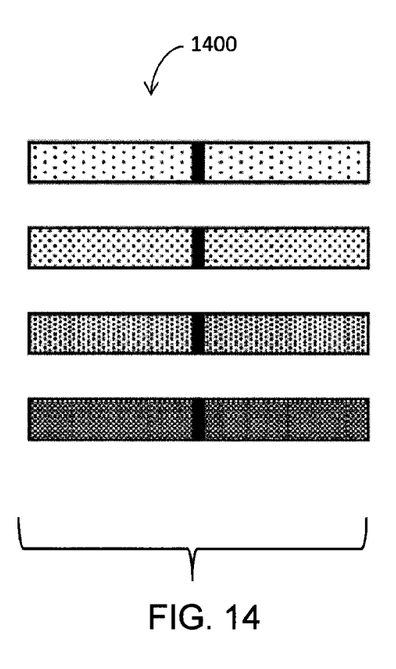
Figure 15:
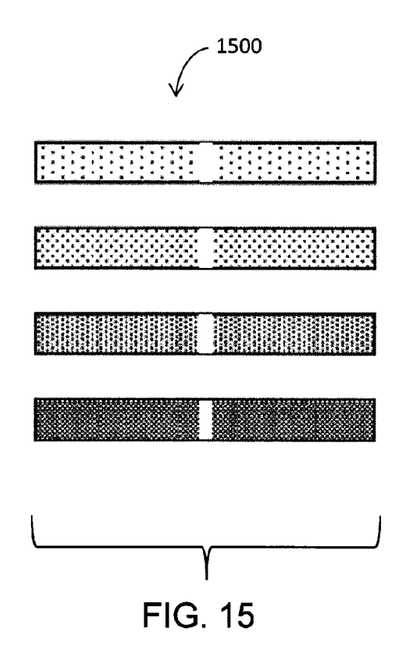

FIGS. 13-15 depict examples of test block patterns in an embodiment in accordance with the invention. A test block pattern includes test blocks having different known print densities in an embodiment in accordance with the invention. The test blocks in a test block pattern can be printed by two adjacent printheads, by the nozzles in the overlap region, or by the nozzles in or around the stitch boundary of the two adjacent printheads.

FIG. 13 illustrates an example of a test block pattern without stitching artifacts. Test block pattern 1300 includes four test blocks with each test block having a known print density that is different from the print densities of the other test blocks. By way of example only, test block 1302 can have a print density of 0.2, test block 1304 a print density of 0.4, test block 1306 a print density of 0.6, and test block 1308 a print density of 0.8.

FIGS. 14 and 15 illustrate examples of a test block patterns with stitching artifacts. Test block patterns 1400 and 1500 include four test blocks with each test block having a known print density that is different from the print densities of the other test blocks. The stitching artifacts in the test blocks in test block pattern 1400 are produced by over-printing in or around the stitch boundary. The stitching artifacts in the test blocks in test block pattern 1500 are produced by under-printing in or around the stitch boundary. Other embodiments in accordance with the invention can detect both under-printing and over-printing stitching artifacts in the same test block or in different test blocks within the same test block pattern.

Figure 16:
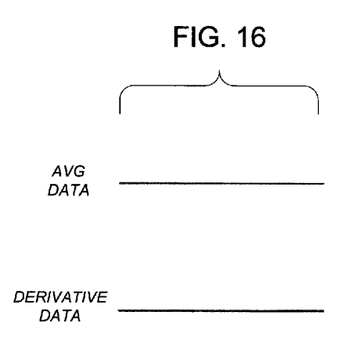
FIGS. 16-18 illustrate example plots of averaged pixel data and plots of first derivative data in an embodiment in accordance with the invention.
Figure 17:
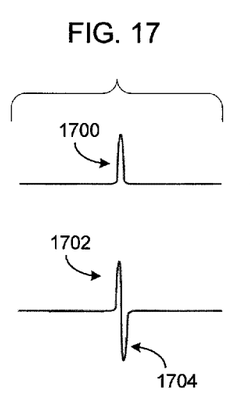
Figure 18:
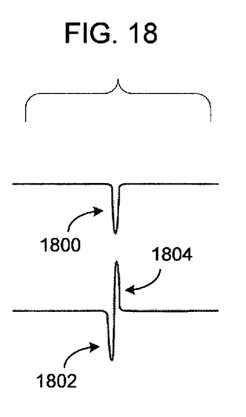

FIGS. 16-18 illustrate example plots of averaged pixel data and plots of first derivative data in an embodiment in accordance with the invention. The plots in FIG. 16 correspond to the stitched printed content shown in FIG. 4. When the stitched content does not include a stitching artifact, as shown in FIG. 4, the plots of the averaged pixel data and first derivative data are straight, or substantially straight, lines (see FIG. 16).

The plots in FIG. 17 correspond to the stitched printed content shown in FIG. 5. When the stitched printed content includes a stitching artifact produced by over-printing, as shown in FIG. 5, the plot of the averaged pixel data includes an upward peak 1700 (see FIG. 17). The plot of the first derivative data includes a peak having a positive region 1702 followed by a negative region 1704. The terms positive and negative are intended to be generic and not specific to real numbers that are greater or less than zero. The order of the positive and negative regions in the first derivative data can assist in determining the type of stitching artifact. A positive region followed by a negative region can represent a stitching artifact produced by over-printing in or around a stitch boundary.

The plots in FIG. 18 correspond to the stitched printed content shown in FIG. 6. When the stitched printed content includes a stitching artifact produced by under-printing, as shown in FIG. 6, the plot of the averaged pixel data includes a downward peak 1800 (see FIG. 18). The plot of the first derivative data includes a peak having a negative region 1802 followed by a positive region 1804. The order of the positive and negative regions in the first derivative data can assist in determining the type of stitching artifact. A negative region followed by a positive region can represent a stitching artifact produced by under-printing in or around a stitch boundary.

Embodiments in accordance with the invention can be used to complement existing stitching artifact detection systems. The current stitching artifact detection systems can be used to select and correct a stitching algorithm and the one or more integrated imaging systems can be used to monitor stitching during a print job. The stitching can be monitored continuously or at select times.

The invention has been described in detail with particular reference to certain preferred embodiments thereof, but it will be understood that variations and modifications can be effected within the spirit and scope of the invention. And even though specific embodiments of the invention have been described herein, it should be noted that the application is not limited to these embodiments. In particular, any features described with respect to one embodiment may also be used in other embodiments, where compatible. And the features of the different embodiments may be exchanged, where compatible.

1. A printing system includes a linehead that includes two adjacent printheads, a stitch boundary formed by the two adjacent printheads, and an integrated imaging system positioned opposite a moving print media for capturing one or more images of content printed on the moving print media in at least the stitch boundary. The integrated imaging system includes a housing; an opening in the housing for receiving light reflected from the moving print media; a folded optical assembly in the housing that receives the reflected light and transmits the light a predetermined distance; and an image sensor within the housing that receives the light and captures the one or more images. An image processing device is connected to the integrated imaging system and adapted to determine derivative data of averaged pixel data obtained from the one or more captured images and to detect one or more peaks in the derivative data that represent stitching artifacts.

2. A printing system includes a linehead that includes two adjacent printheads positioned in a staggered formation. Each printhead includes multiple nozzles, where a portion of nozzles in one printhead overlaps a portion of nozzles in the other printhead to form an overlap region. An integrated imaging system is positioned opposite a moving print media for capturing one or more images of content printed on the moving print media in at least the overlap region. The integrated imaging system includes a housing; an opening in the housing for receiving light reflected from the moving print media; a folded optical assembly in the housing that receives the reflected light and transmits the light a predetermined distance; and an image sensor within the housing that receives the light and captures the one or more images. An image processing device is connected to the integrated imaging system and adapted to determine derivative data of averaged pixel data obtained from the one or more captured images and to detect one or more peaks in the derivative data that represent stitching artifacts.

3. The printing system as in clause 1 or clause 2, where the integrated imaging system can include at least two vent openings in the housing, one vent opening for inputting tempered air and one vent opening for outputting exhaust.

4. The printing system as in clause 1 or clause 2, where the integrated imaging system can include a vent opening in the housing for receiving air or gas.

5. The printing system as in clause 4, where the opening in the housing is used to output exhaust.

6. The printing system as in any one of clauses 1-5, where the integrated imaging system can be disposed opposite the print media at a location where the print media is transported over a roller.

7. The printing system in clause 6 can include a motion encoder connected to the roller, where the motion encoder is adapted to output a signal proportional to a fixed amount of incremental motion of the print media.

8. The printing system as in any one of clauses 1-8, where the integrated imaging system can include a light source for emitting light towards the print media.

9. The printing system as in any one of clauses 1-8, where the folded optical assembly can include one or more lenses; and at least one mirror for directing the reflected light to the one or more lenses.

10. The printing system in any one of clauses 1-9 can include a transparent cover over the opening in the housing.

11. The printing system as in any one of clauses 1-10, where the image sensor can include one or more linear image sensors.

12. A printing system includes a linehead that includes two adjacent printheads and a stitch boundary formed by the two adjacent printheads, and an integrated imaging system positioned opposite a moving print media for capturing one or more images of content printed on the moving print media in at least the stitch boundary. A method for monitoring the stitching between the two adjacent printheads includes (a) capturing one or more images of content printed on a moving print media in at least a stitch boundary to obtain pixel data; (b) averaging the pixel data to produce blur in a media transport direction; (c) determining derivative data of the averaged pixel data; (d) detecting a peak in the derivative data; and (e) determining a type of stitching artifact based on the detected peak in the derivative data.

13. A printing system includes a linehead that includes two adjacent printheads positioned in a staggered formation. Each printhead includes multiple nozzles, where a portion of nozzles in one printhead overlaps a portion of nozzles in the other printhead to form an overlap region. An integrated imaging system is positioned opposite a moving print media for capturing one or more images of content printed on the moving print media in at least the overlap region. A method for monitoring the stitching between the two adjacent printheads includes (a) capturing one or more images of content printed on a moving print media in at least the overlap region to obtain pixel data; (b) averaging the pixel data to produce blur in a media transport direction; (c) determining derivative data of the averaged pixel data; (d) detecting a peak in the derivative data; and (e) determining a type of stitching artifact based on the detected peak in the derivative data.

14. The method in clause 12 or clause 13 can include (f) adjusting a stitching algorithm based on the type of stitching artifact.

15. The method as in any one of clauses 12-14, where averaging the pixel data to produce blur in a media transport direction can include optical averaging.

16. The method as in any one of clauses 12-14, where averaging the pixel data to produce blur in a media transport direction can include numerical averaging.

17. The method in any one of clauses 12-16 can include prior to performing (e), determining whether the peak in the derivative data equals or exceeds a threshold value; and if the peak equals or exceeds the threshold value, performing (e).

18. The method as in any one of clauses 12-17, where determining a type of stitching artifact based on the detected peak in the derivative data can include determining a type of stitching artifact based on a shape of the detected peak in the derivative data.

PARTS LIST 100 linehead
102 printhead
104 nozzle array
106 overlap region
200 nozzle
202 nozzle
204 nozzle
206 stitch boundary
208 ink dots
300 nozzle
302 nozzle
304 nozzle
306 nozzle
308 nozzle
310 nozzle
312 nozzle
314 nozzle
316 nozzle
318 nozzle
320 stitch boundary
322 ink dots
324 ink dots
326 ink dots
400 printed content
500 printed content
502 stitching artifact
600 printed content
602 stitching artifact
700 printing system
702 printing module
704 printing module
706 linehead
708 dryer
710 quality control sensor
712 print media
714 transport direction
716 turnover module
718 processing device
800 printing system
802 printhead
804 nozzle array
806 support structure
808 heat
810 integrated imaging system
900 printing system
902 integrated imaging system
904 print media
906 roller
908 image processing device
910 motion encoder
912 storage device
1000 light source
1001 opening in housing
1002 transparent cover
1004 folded optical assembly
1006 image sensor
1010 housing
1012 mirror
1014 mirror
1016 lens
1018 vent opening
1020 vent opening
1300 test block pattern
1302 test block
1304 test block
1306 test block
1308 test block
1400 test block pattern
1500 test block pattern
1700 upward peak
1702 positive region
1704 negative region
1800 downward peak
1802 negative region
1804 positive region

The invention claimed is:

1. A method for monitoring stitching between printheads in a printing system, the method comprising:
   (a) capturing one or more images of content printed on a moving print media in at least a stitch boundary to obtain pixel data;
   (b) averaging the pixel data to produce blur in a media transport direction;
   (c) determining derivative data of the averaged pixel data;
   (d) detecting a peak in the derivative data; and
   (e) determining a type of stitching artifact based on the detected peak in the derivative data.

2. The method as in claim 1, further comprising (t) adjusting a stitching algorithm based on the type of stitching artifact.

3. The method as in claim 1, wherein averaging the pixel data to produce blur in a media transport direction comprises optical averaging.

4. The method as in claim 1, wherein averaging the pixel data to produce blur in a media transport direction comprises numerical averaging.

5. The method as in claim 1, further comprising:
   prior to performing (e), determining whether the peak in the derivative data equals or exceeds a threshold value; and
   if the peak equals or exceeds the threshold value, performing (e).

6. The method as in claim 1, wherein determining a type of stitching artifact based on the detected peak in the derivative data comprises determining a type of stitching artifact based on a shape of the detected peak in the derivative data.

7. The method as in claim 1, wherein determining a type of stitching artifact based on the detected peak in the derivative data further includes determining an order of the positive and negative regions in the derivative data.

8. A method for monitoring stitching between printheads in a printing system, wherein each printhead includes a plurality of nozzles and at least a portion of nozzles in one printhead overlaps a portion of nozzles in the other printhead to form an overlap region, the method comprising:
   (a) capturing one or more images of content printed on a moving print media in at least the overlap region to obtain pixel data;
   (b) averaging the pixel data to produce blur in a media transport direction;
   (c) determining derivative data of the averaged pixel data;
   (d) detecting a peak in the derivative data; and
   (e) determining a type of stitching artifact based on the detected peak in the derivative data.

9. The method as in claim 8, further comprising (f) adjusting a stitching algorithm based on the type of stitching artifact.

10. The method as in claim 8, wherein averaging the pixel data to produce blur in a media transport direction comprises optical averaging.

11. The method as in claim 8, wherein averaging the pixel data to produce blur in a media transport direction comprises numerical averaging.

12. The method as in claim 8, further comprising:
   prior to performing (e), determining whether the peak in the derivative data equals or exceeds a threshold value; and
   if the peak equals or exceeds the threshold value, performing (e).

13. The method as in claim 8, wherein determining a type of stitching artifact based on the detected peak in the derivative data comprises determining a type of stitching artifact based on a shape of the detected peak in the derivative data.

14. The method as in claim 8, wherein determining a type of stitching artifact based on the detected peak in the derivative data further includes determining an order of the positive and negative regions in the derivative data.

* * * * *